US010675730B2

(12) United States Patent
Wagner et al.

(10) Patent No.: US 10,675,730 B2
(45) Date of Patent: Jun. 9, 2020

(54) METHOD FOR PRODUCING ROTATIONALLY SYMMETRICAL, NON CYLINDRICAL BORES USING A HONING TOOL

(71) Applicant: GEHRING TECHNOLOGIES GMBH, Ostfildern (DE)

(72) Inventors: Andreas Wagner, Denkendorf (DE); Andreas Wiens, Sachsenheim (DE); Niko Schamne, Ostfildern (DE); Manuel Waiblinger, Stuttgart (DE)

(73) Assignee: GEHRING TECHNOLOGIES GMBH, Ostfildern (DE)

( * ) Notice: Subject to any disclaimer, the term of this patent is extended or adjusted under 35 U.S.C. 154(b) by 224 days.

(21) Appl. No.: 15/577,017

(22) PCT Filed: May 27, 2016

(86) PCT No.: PCT/EP2016/062064
§ 371 (c)(1),
(2) Date: Nov. 27, 2017

(87) PCT Pub. No.: WO2017/071832
PCT Pub. Date: May 4, 2017

(65) Prior Publication Data
US 2018/0318979 A1    Nov. 8, 2018

(30) Foreign Application Priority Data

Mar. 15, 2016    (DE) .................. 10 2016 104 754

(51) Int. Cl.
*B23B 41/06*        (2006.01)
*B24B 3/02*         (2006.01)
(Continued)

(52) U.S. Cl.
CPC ............ *B24B 33/025* (2013.01); *B23B 41/06* (2013.01); *B24B 3/02* (2013.01); *B24B 5/08* (2013.01);
(Continued)

(58) Field of Classification Search
CPC .. B23B 41/06; B24B 5/06; B24B 5/08; B24B 5/10; B24B 33/02; B24B 33/022;
(Continued)

(56) References Cited

U.S. PATENT DOCUMENTS

| 2,020,812 A | 5/1933 | Turner et al. |
| 4,455,789 A * | 6/1984 | Gehring .................. B24B 33/02 451/156 |

(Continued)

FOREIGN PATENT DOCUMENTS

| DE | 10306864 B3 | 7/2004 |
| DE | 10358150 A1 | 7/2005 |

(Continued)

OTHER PUBLICATIONS

Translated Office Action dated Feb. 19, 2019, pp. 1-4, for application 2017-561632.

(Continued)

*Primary Examiner* — Eileen P Morgan
(74) *Attorney, Agent, or Firm* — Bond Schoeneck & King, PLLC; George McGuire

(57) ABSTRACT

A method and suitable honing tools for honing conical bores are proposed.

6 Claims, 12 Drawing Sheets

Figure 1A:
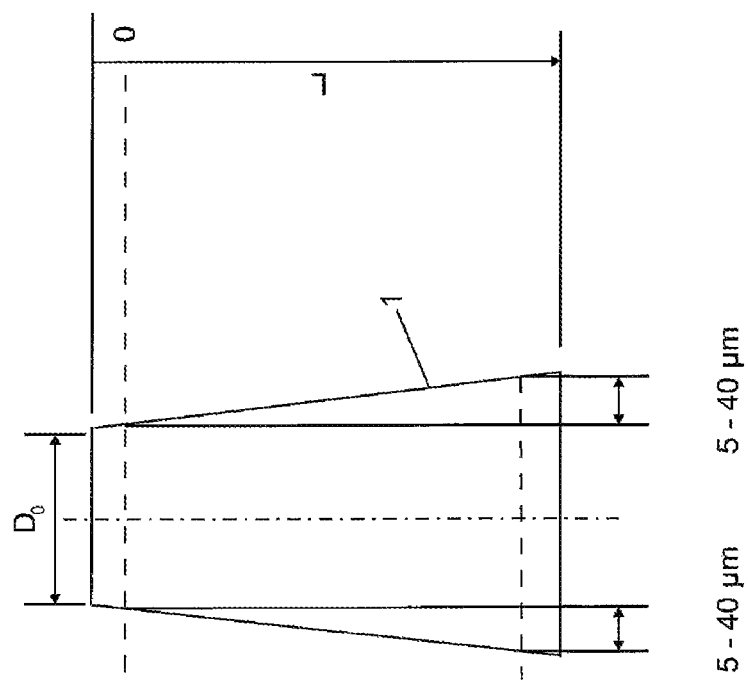

(51) Int. Cl.
  *B24B 5/08* (2006.01)
  *B24B 33/02* (2006.01)
  *B24B 33/08* (2006.01)

(52) U.S. Cl.
  CPC .......... *B24B 33/027* (2013.01); *B24B 33/088* (2013.01); *B24B 33/089* (2013.01)

(58) Field of Classification Search
  CPC ... B24B 33/025; B24B 33/027; B24B 33/083; B24B 33/088
  USPC .......................................................... 451/51
  See application file for complete search history.

(56) References Cited

U.S. PATENT DOCUMENTS

| | | | | |
|---|---|---|---|---|
| 5,177,904 | A * | 1/1993 | Nagel | B24B 33/06 451/156 |
| 5,800,252 | A * | 9/1998 | Hyatt | B24B 33/105 451/164 |
| 6,960,121 | B2 * | 11/2005 | Klink | B24B 33/02 451/177 |
| 7,563,154 | B2 * | 7/2009 | Oota | B24B 9/00 451/231 |
| 8,292,695 | B2 * | 10/2012 | Flores | B24B 33/088 451/155 |
| 8,961,265 | B2 * | 2/2015 | Rauscher | B23Q 17/2471 451/27 |
| 10,322,490 | B2 * | 6/2019 | Flores | B24B 33/04 |
| 2007/0060025 | A1 * | 3/2007 | Haerer | B24B 1/00 451/51 |
| 2010/0197199 | A1 * | 8/2010 | Flores | B24B 33/02 451/27 |
| 2016/0243668 | A1 * | 8/2016 | Wiens | B24B 33/02 |
| 2017/0129070 | A1 * | 5/2017 | Flores | B24B 33/04 |
| 2019/0111540 | A1 * | 4/2019 | Litty | B24B 33/025 |

FOREIGN PATENT DOCUMENTS

| | | |
|---|---|---|
| DE | 102006062665 A1 | 7/2008 |
| DE | 102013204714 A1 | 10/2014 |
| DE | 102013223011 A1 | 5/2015 |
| DE | 102014210012 A1 | 11/2015 |
| DE | 102014212941 A1 | 1/2016 |
| EP | 1321229 A1 | 6/2003 |
| EP | 1815944 A1 | 8/2007 |
| WO | 2011152216 A1 | 7/2013 |
| WO | 2014146919 A1 | 9/2014 |

OTHER PUBLICATIONS

German Office Communication dated Mar. 27, 2018.
English translation of Korean Office Action for application 10-2017-7036829, dated Jun. 4, 2019, pp. 1-10.
International Search Report and Written Opinion Form PCT/ISA/210 and PCT/ISA/237. International Application No. PCT/EP2016/062064, pp. 1-11, International Filing Date May 27, 2016, dated Dec. 23, 2016.

* cited by examiner (1. Alternative)

(1. Alternative)

METHOD FOR PRODUCING ROTATIONALLY SYMMETRICAL, NON CYLINDRICAL BORES USING A HONING TOOL

CROSS-REFERENCE TO RELATED APPLICATIONS

This application is the United States National Stage entry under 35 U.S.C. 371 of PCT/EP2016/062064, filed May 27, 2016, which claims priority to German application serial number 102015209609.2, filed May 26, 2015, and German application serial number 102016104754.6, filed Mar. 15, 2016, the entire disclosure of each of which is incorporated herein by reference.

DESCRIPTION

The invention relates to a method for making a cylindrical bore into a conical bore using a honing tool, and to a process chain for shaping cylindrical bores.

Motor vehicle manufacturers are faced with the long-term task of continuously reducing the fuel consumption of their vehicle fleets that are equipped with reciprocating piston engines. In reciprocating piston engines, the friction between the pistons or piston rings and the cylindrical bore accounts for up to 35%, i.e. a sizable proportion, of the internal friction losses. Therefore, reducing the friction in the region of the cylindrical bore has a considerable potential for reducing fuel consumption.

One approach for reducing the friction between the piston and the cylindrical bore consists of the form honing process developed by the applicant, which process is explicitly described in EP 2 170 556 B1. In this method, deviations from the geometry of a cylinder caused by stresses that occur during mounting and/or thermal expansion of the cylindrical bore are cancelled out by complementary projections or recesses being formed during the form honing process. This method is very effective and is successfully used in the production of various reciprocating piston engines.

DE 10 2013 204 714 A1 discloses a honing method by means of which the cylindrical bore of an internal combustion engine is given a bottle shape. In this case, "bottle shape" refers to a shape in which the cylindrical bore has two cylindrical portions of different diameters. The portion having the smaller diameter is provided in the region of the cylinder head, whereas the portion having the larger diameter is provided in the region of the crankshaft. A frustoconical transition region is formed between these regions and covers approximately 5% to 20% of the bore length.

DE 103 581 50 A1 discloses a method by means of which two portions which are positioned in succession in the axial direction of a cylindrical bore and have different hardness levels can be processed. Said method and the associated tool can be used advantageously when the cylindrical bore is hardened in regions, as a result of which the hardened portion and the unhardened portion have to be honed in different ways.

This document discloses that the cylindrical bore is designed, at the open end thereof, i.e. where the cylinder head is later mounted, such that there is a widening of the cylindrical bore. This is shown graphically in FIG. 6 of this document. Therefore, a "widening" refers to a slight expansion in the upper portion of the cylindrical bore. In this case, said widening only affects approximately the uppermost quarter of the cylindrical bore.

The object of the invention is to provide honing methods, and a process chain and suitable honing tool for carrying out the methods, which chain makes it possible to produce cylindrical bores in a cost-effective and reproducible manner, in which methods the friction between the piston rings and in particular between the piston skirt and the cylindrical bore is minimized and as a result of which the emission behavior and fuel consumption of the internal combustion engine equipped with cylinders of this kind are optimized.

In this case, the envisaged geometry of the "cylindrical bore" is a conic frustum. In some circumstances, the bore also has one or two additional cylindrical portions. Within the meaning of the invention, a frustoconical (cylindrical) bore is a bore of which the diameter changes continuously over more than half the length, preferably at least % of the length, of the cylindrical bore. Ideally, the conic frustum even covers more than 85%, or in some cases even up to 100%, of the length of the cylindrical bore.

This object is achieved according to the invention by a method according to claims 1 and 6 for making a cylindrical bore or parts of a cylindrical bore into a conical bore or parts of a conical bore. In the method according to claim 1, a honing tool is preferably used of which honing stones have a length that is shorter than one third of the length of the bore to be processed.

The method according to the invention comprises the steps of: applying the honing stones of the honing tool to the bore and honing the bore over its entire length with a maximum stroke Hmax(=OP1–UP). In the context of the invention, this process step is referred to as "cylindrical honing". The purpose of this step is to bring the geometry and diameter of the (still) cylindrical bore to the desired values.

An alternative to the process step of "cylindrical honing" is that of precision boring. In the context of the invention, this process step is referred to as "cylindrical precision boring".

Subsequently, the bore is honed with decreasing stroke, a lower reversal point UP of the honing tool remaining substantially unchanged. This means that the part of the bore located at the lower reversal point of the honing tool is processed by the honing stones more often than the part of the bore located at the upper reversal point. Therefore, the increase in diameter is greater at the lower reversal point UP than in the region of the upper reversal point. As a result, the originally cylindrical bore gets increasingly wider towards the lower reversal point. According to the invention, the step of honing the bore with decreasing stroke is brought to an end as soon as the upper reversal point OP has reached a predefined OP2 (OP=OP2). It has been shown that, in this way, an originally cylindrical bore can be transformed into a slightly conical bore, the region of the conical part of the bore extending over more than 75% of the length of the bore. The method according to the invention can be designed so as to be very simple and reliable, and it is possible, in this method, to produce a bore of which the surface line is as close as possible to that of a conic frustum.

It has also been found to be advantageous for the honing tool to only be fed when the honing tool is close to the lower reversal point UP. The lower reversal point is the region of the bore which has the largest diameter after the method according to the invention has been carried out. For example, the honing tool can only be fed when the honing tool is between the predefined end value OP2 and the lower reversal point UP. OP2 is the point on the stroke path which is approached with all of the strokes that are constantly getting shorter. On the path from OP2 to UP, the honing tool is fed incrementally. OP2 therefore determines the upper reversal point of the smallest stroke and thus also the last stroke of the processing cycle. The distance OP2-UP is the smallest path interval which all of the strokes pass jointly. This results in the honing stone being fed uniformly with each stroke, irrespective of the length thereof.

Since the cutting speed remains approximately the same despite the decreasing stroke, the speed of the honing spindle can be increased as the stroke shortens.

This embodiment of the method according to the invention is advantageous in that feeding takes place throughout the entire honing process, irrespective of the stroke of the honing tool, and is therefore easy to manage in terms of control. Owing to the constant cutting speed, the condition of the surface also remains the same over the entire length of the honed bore.

In the context of the invention, this process step is referred to as "conical honing with decreasing stroke".

Furthermore, the described type of feeding results in an improved geometry of the finished conical bore because the bore is prevented, to the greatest possible extent, from "collapsing" in the region of the lower reversal point UP. This prevents the bore from having a "bottle shape" that has two cylindrical portions and a short frustoconical intermediate region.

In order for the processed bore to be conical over almost the entire length of the bore, it is advantageous for the maximum stroke $H_{max}$(=OP1−UP) to be more than twice the length of the minimum stroke $H_{min}$(=OP2−UP). It is also possible for the maximum stroke to be three times, or even four times, the length of the minimum stroke. The higher this ratio is, the longer the frustoconical part of the bore. It is therefore also possible for the frustoconical part to extend over the entire length of the bore.

An alternative to the process step of "conical honing" is that of "precision boring with dynamic feeding". In this process, the cutting edge of the precision boring tool is fed according to the position thereof in the bore to be processed. For example, the extent of feeding is at a minimum at the open end of the bore and increases the closer the precision boring tool moves towards the opposite end of the bore. The process step of "precision boring with dynamic feeding" can replace the upstream process steps of "cylindrical honing" and "cylindrical precision boring".

In order to facilitate or conclude the process whereby the cylindrical bore is made into a conical bore, it can also be provided that a feed force by means of which the honing stones are pressed against the bore be controlled according to a position of the honing tool in the bore. In this case, the feed force increases towards the lower reversal point UP and decreases towards the upper reversal point. In the context of the invention, this process step is referred to as "conical honing with dynamic feeding".

The object mentioned at the outset is also achieved by a method for making a cylindrical bore into a conical bore, the parameters relevant to honing, in particular the material hardness and rigidity (caused for example by changes in wall thickness) of the bore are the same over the entire length of the bore, and said method comprises the following steps: applying the honing stones of the honing tool to the bore to be processed, honing the bore over its entire length at a constant contact force of the honing stones against the bore ("cylindrical honing").

The bore is subsequently honed, a feed force by means of which the honing stones are pressed against the bore being controlled according to a position of the honing tool in the bore ("conical honing with dynamic feeding"). Therefore, not only can the process step of "conical honing with dynamic feeding" be used after the step of "conical honing with decreasing stroke", but it can also replace said step.

This method likewise results in the originally cylindrical bore being made into a conical bore in an effective manner. The longer the conical part of the bore, the easier and more precisely the cylindrical bore can be made into a conical bore in the desired manner. Therefore, the feed force generally changes over almost the entire length (e.g. more than 75%) of the bore.

It has also been found to be advantageous for the feed force to increase as the distance between the honing tool and a reversal point increases.

It is possible for the feed force to increase linearly, progressively or degressively as the distance between the honing tool and a reversal point increases. This makes it possible to compensate for effects which lead to a deviation from the desired frustoconical shape of the bore. It is however also possible to selectively create deviations from a geometrically ideal frustoconical shape. For example, the bore can have a particularly wide diameter in the region of the lower reversal point, such that the bore produced using the method according to the invention is formed, in greatly exaggerated terms, in the manner of the bell of a trombone. Rigidity which changes locally over the length of the bore can also be compensated for by locally changed feeding.

In order to facilitate the process whereby the bores are made into conical bores, in this method it is possible to hone said bores with decreasing stroke in some cases, a lower reversal point UP of the honing tool remaining substantially unchanged. In this variant of the method according to the invention, it is likewise provided that the honing process is brought to an end as soon as the upper reversal point has reached a predefined end value.

It has been found to be particularly worthwhile for the stroke of the honing spindle to be increased again at the end of conical honing to such an extent that the honing stones process the entire length of the bore with one stroke in order to achieve the desired cross-grinding using as few reversal points as possible. This can be of great importance in terms of the functionality of the surface.

The methods according to the invention for producing a bore that is frustoconical for the most part from an originally cylindrical bore can be integrated in large-scale production in a process chain for shaping cylindrical bores, this process chain comprising pre-honing a bore. In this process, a first honing tool or first honing stones of a honing tool can be used. The aim of pre-honing the bore is to produce the desired diameter of the bore that is still cylindrical or the portion of the bore that is still cylindrical and to achieve very high geometric accuracy for the bore.

The originally cylindrical bore is then made, in part, into a conical bore according to a predefined method.

In a further step, the bore that has been made into a conical bore undergoes finish honing, i.e. the desired surface finish and surface condition of the bore that has been made into a conical bore is achieved. This can also take place in several steps at a corresponding distribution of cutting passes.

In a final, optional processing step, the bore is smoothed.

In the table given below, the most important process chains according to the invention are compiled in columns. All of the process chains listed in the table produce a non-cylindrical, rotationally symmetrical bore having a uniform roughness profile.

| Process step | Process chain | | | | | | | | |
|---|---|---|---|---|---|---|---|---|---|
| cylindrical honing | X | X | X | X | | | | | |
| conical precision boring | | | | | | | | X | X |
| conical honing with decreasing stroke | X | | X | | X | | X | | |
| conical honing with dynamic feeding | X | X | | X | X | X | | X | X |
| smoothing by spring force | X | X | X | | X | X | X | | X | X |

Further advantages and advantageous embodiments of the invention can be found in the following drawings, the description thereof and the claims. Only some process chains are shown and described step by step. The statements made with regard to the individual process steps of a process chain also apply in connection with the other process chains.

DRAWINGS

Figure 1B:
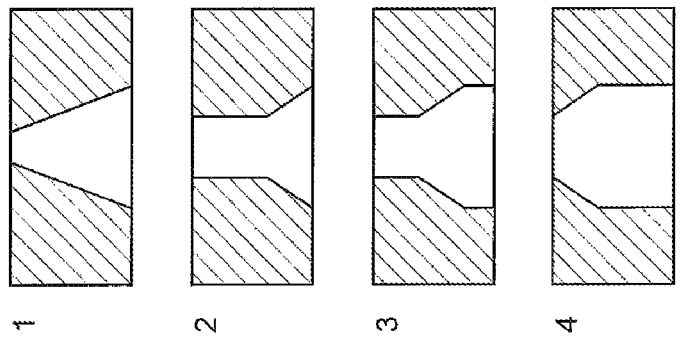
Figure 2:
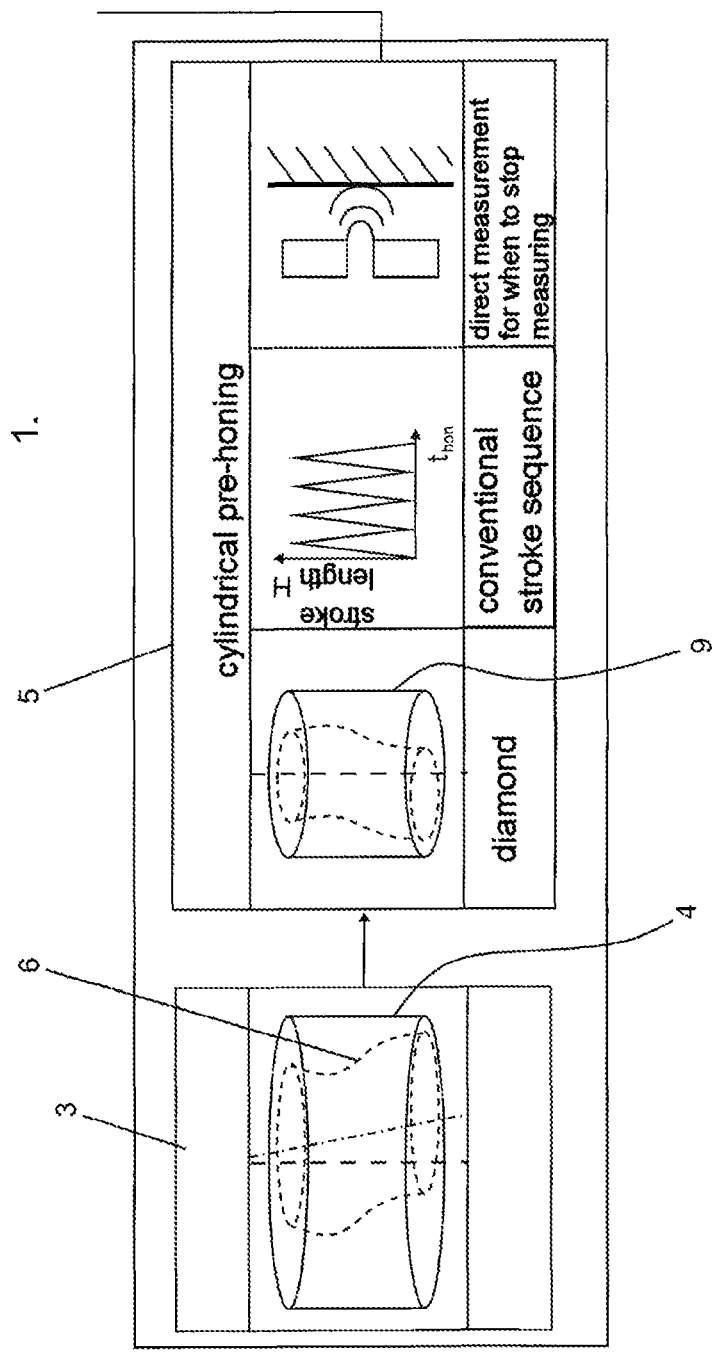
Figure 3:
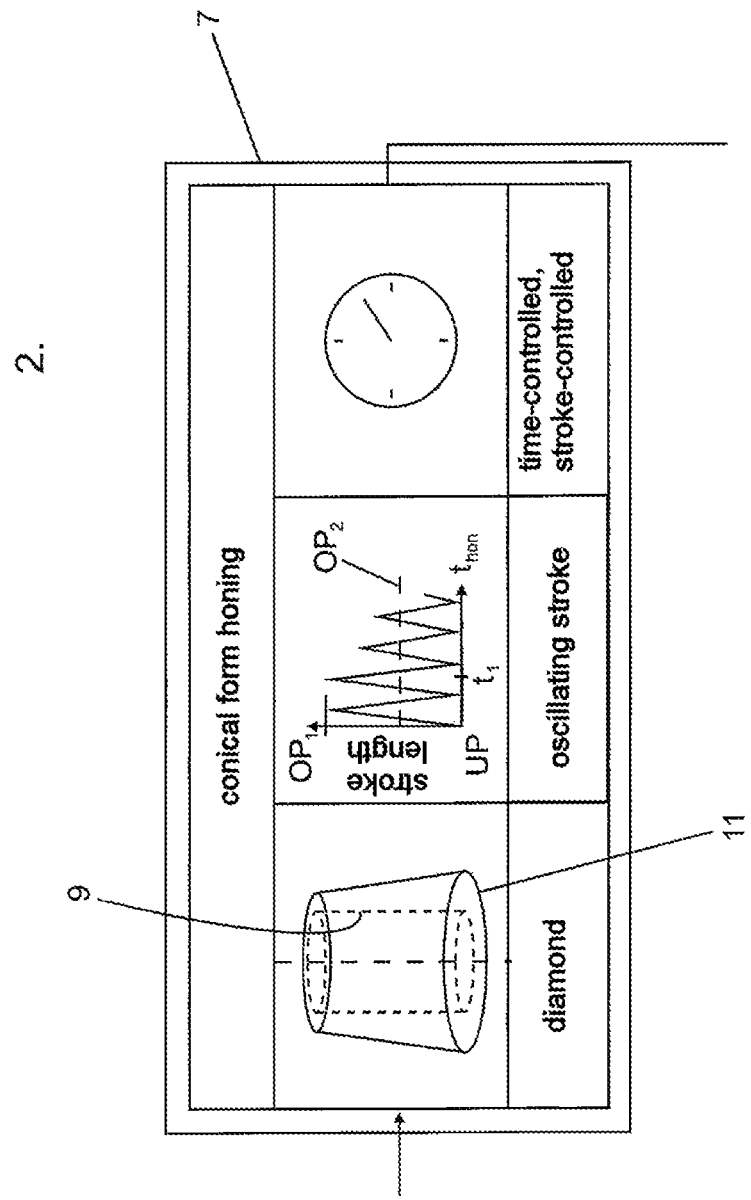
Figure 4:
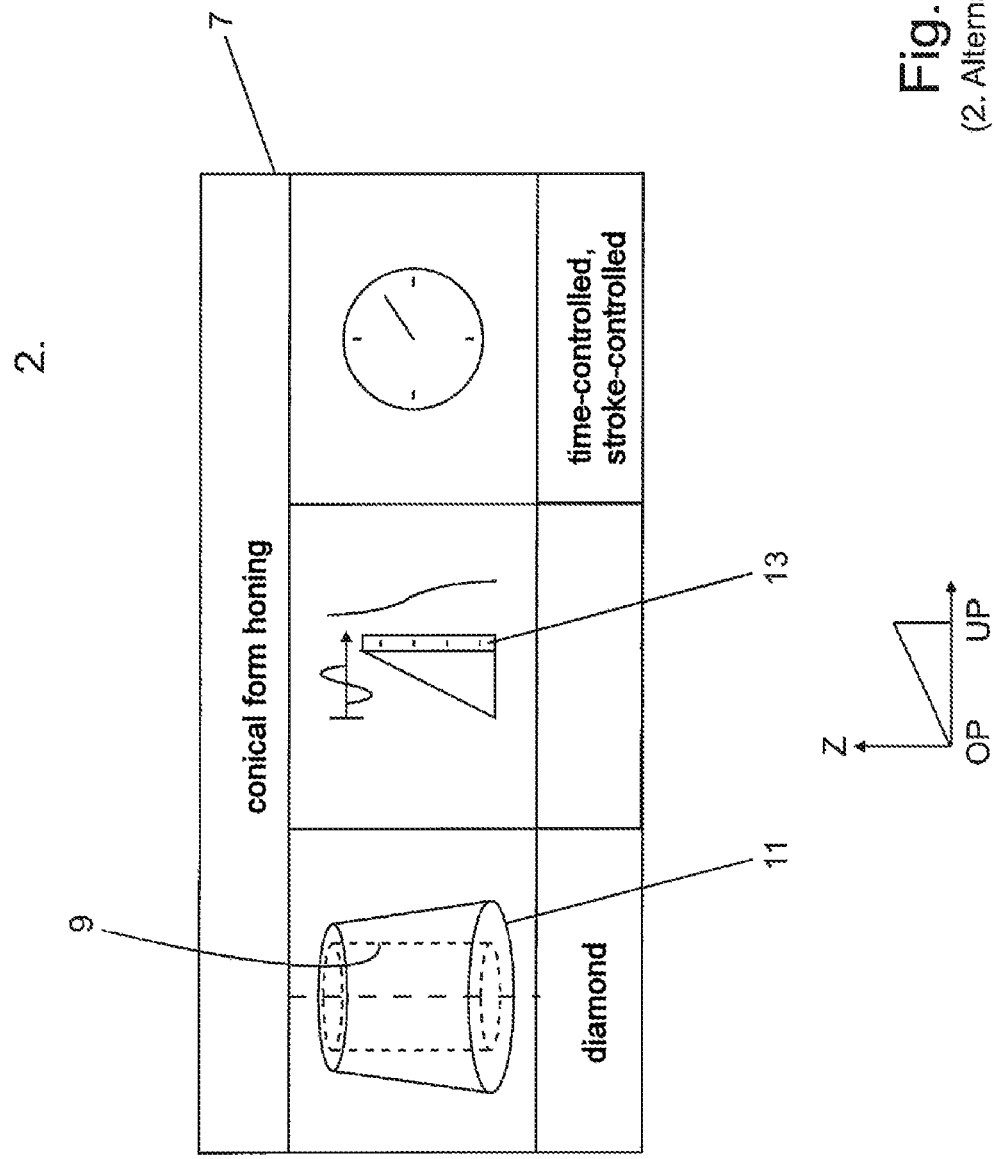
Figure 5:
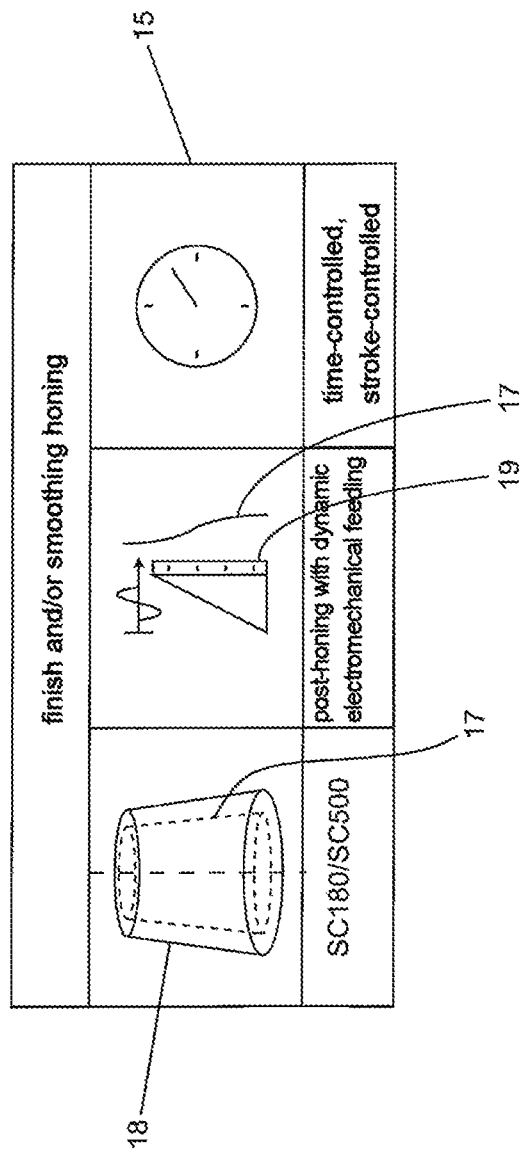
Figure 6:
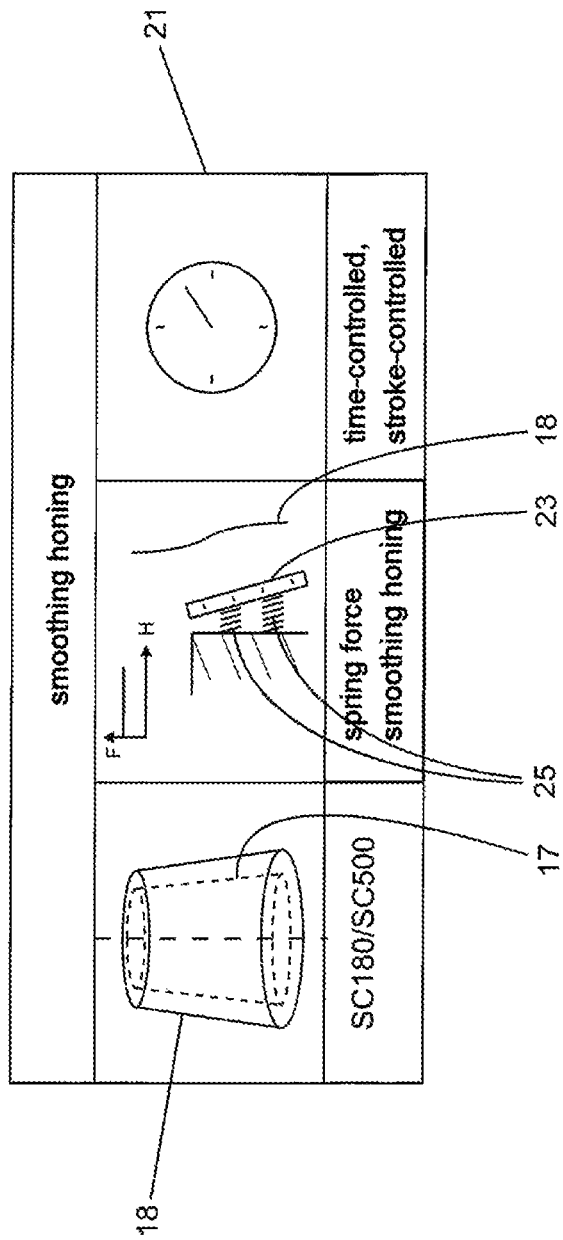
Figure 7:
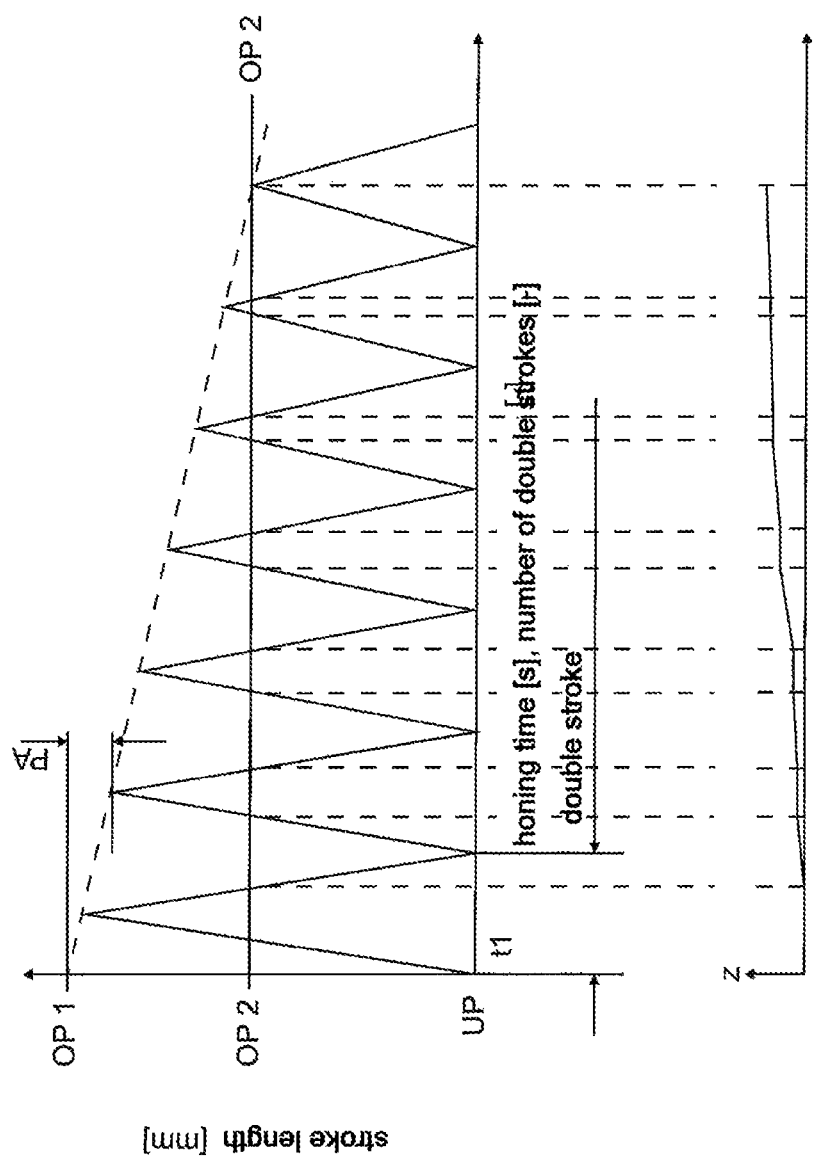
Figure 8:
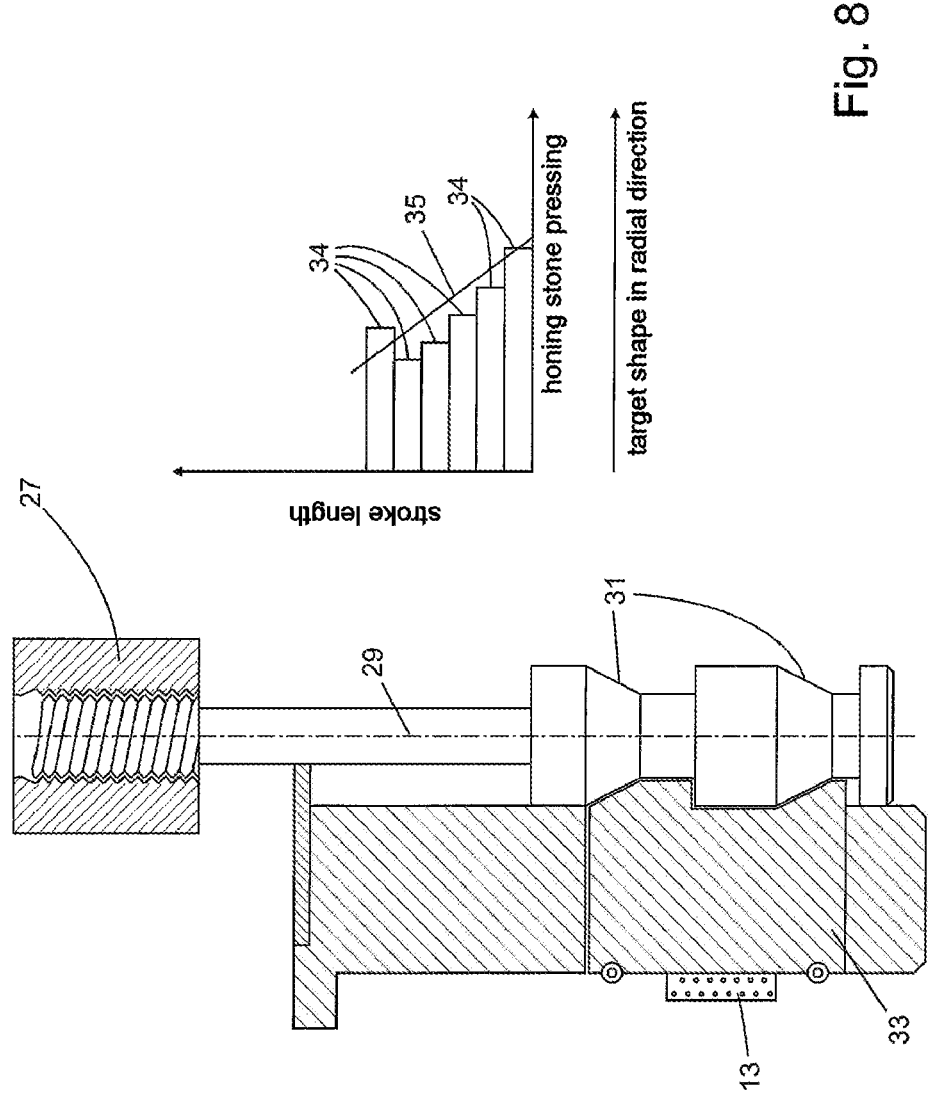
Figure 9:
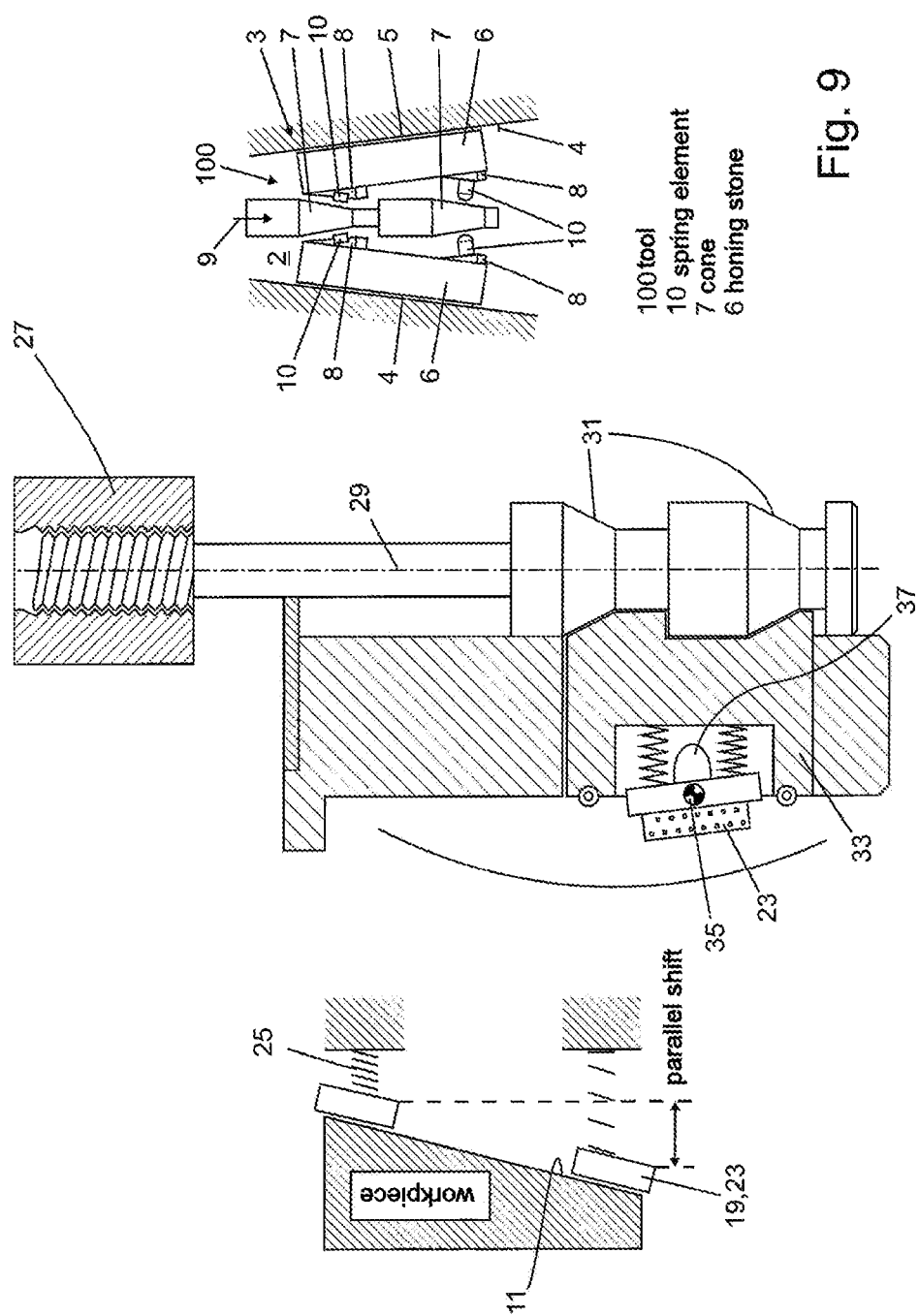
Figure 10:
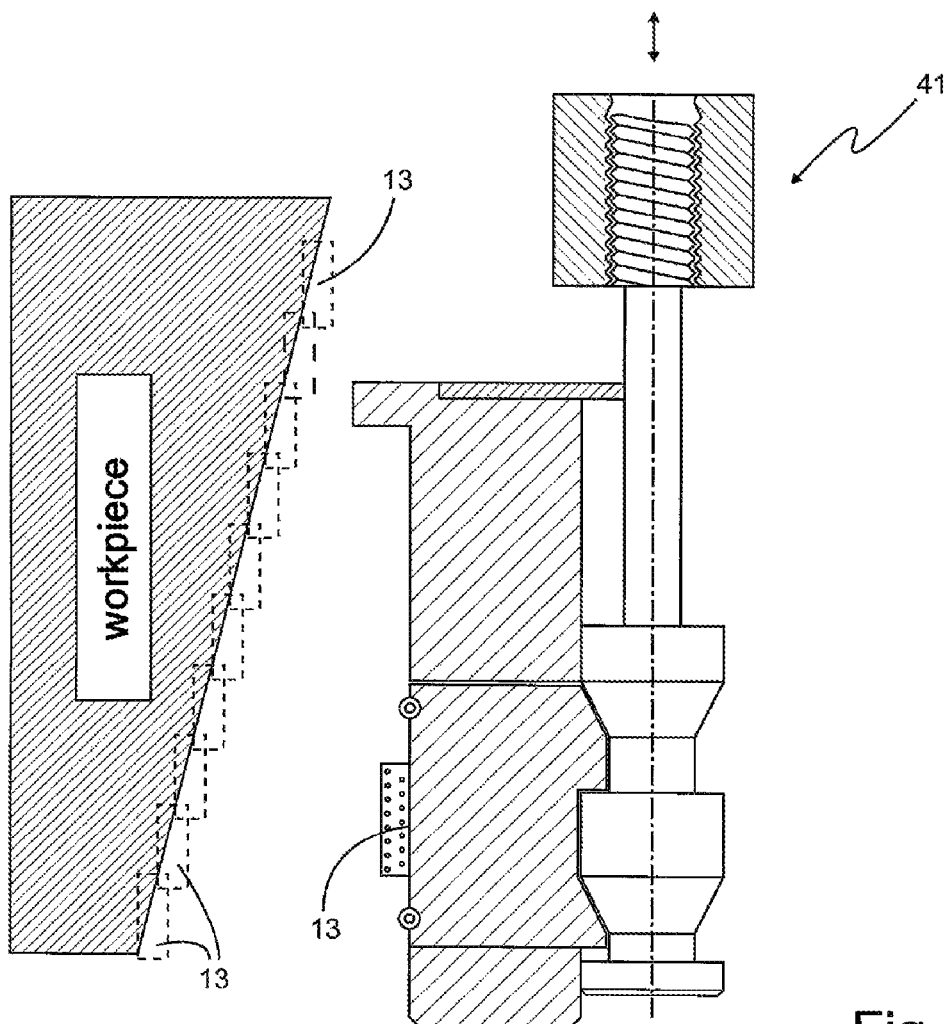
Figure 11:
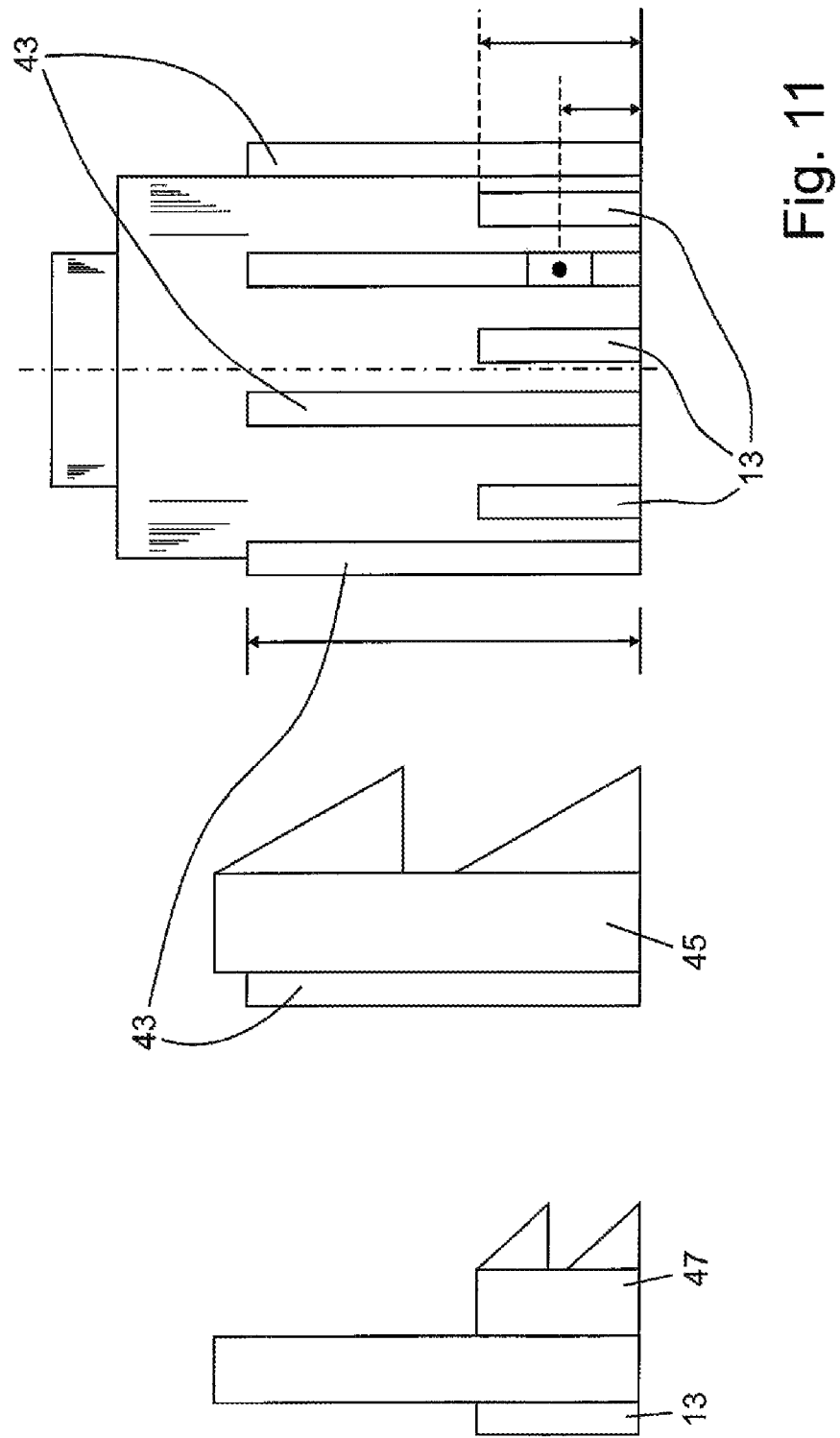
Figure 12:
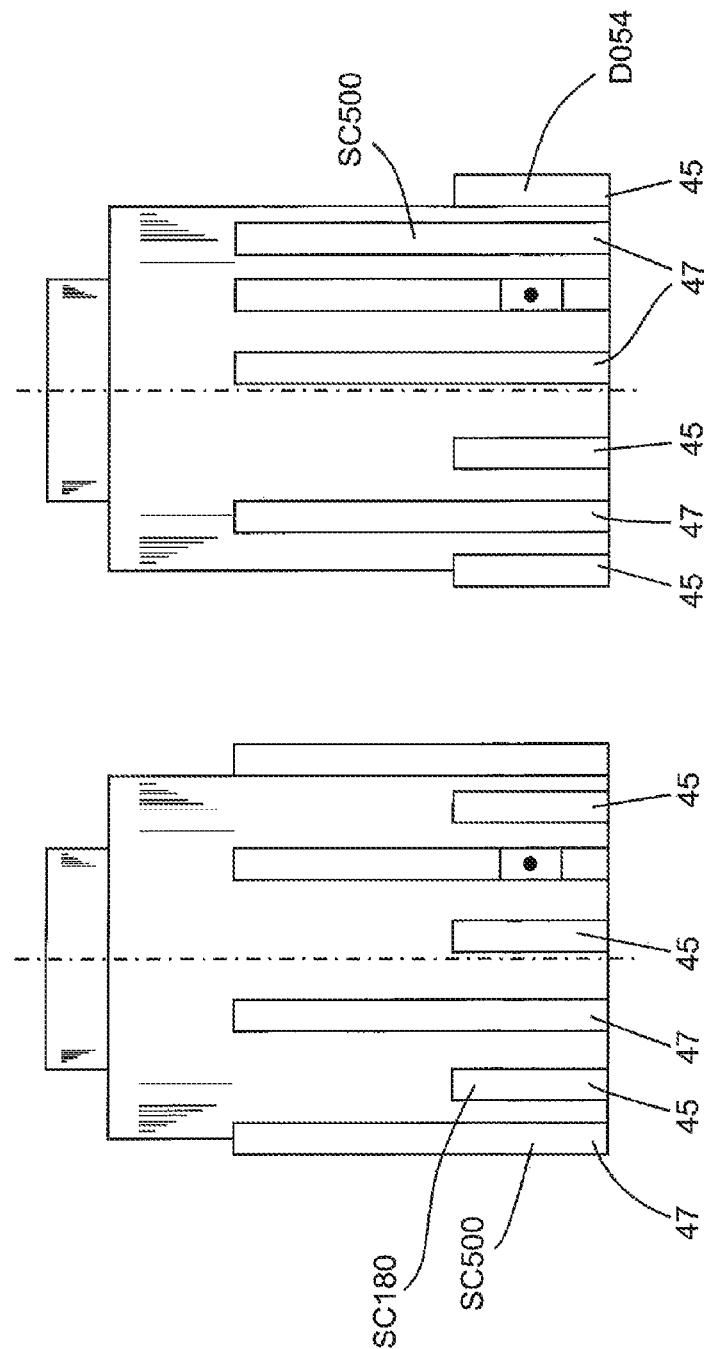

In the drawings:

FIGS. 1a and 1b are schematic views of an originally cylindrical bore which has been made into a conical bore using the method according to the invention, FIG. 2 shows the cylindrical pre-honing as the first step of the process chain according to the invention, FIG. 3 shows a first alternative of the honing process according to the invention, FIG. 4 shows a second alternative of the honing process according to the invention, FIG. 5 shows the finish honing in a first embodiment, FIG. 6 shows the fourth process step of smoothing honing using spring-loaded honing stones, FIG. 7 is a representation of the first alternative of the conical honing according to the invention, FIG. 8 is a representation of the second alternative of the conical honing according to the invention, FIG. 9 shows different options for the smoothing (fourth process step), FIG. 10 is an illustration of the third and fourth process steps with dynamic feeding, FIG. 11 shows a combination tool, namely a honing tool having double feeding for the process steps of pre-honing and conical honing, FIG. 12 is a representation of a honing tool that can have double feeding for the finish honing and smoothing honing.

DESCRIPTION OF THE EMBODIMENTS

FIG. 1a schematically shows a cylindrical bore having a diameter of $D_0$ mm and a bore length L.

The diameter $D_0$ is the diameter of the bore after pre-honing and when the bore is still cylindrical. This means that the bore has the diameter $D_0$ over the entire length L.

The aim of the method according to the invention is to produce a bore that is conical for the most part. In the example shown in FIG. 1, the bore is conical over the entire length L after the conical honing according to the invention has been carried out. By way of example, in FIG. 1, the associated diameters Do are shown for (+0.010 to +0.080 mm) in a first measuring plane below the upper edge of the bore and in a second measuring plane which is arranged in close proximity to the lower end of the bore. The surface line of the conically honed bore is provided with reference sign 1 in FIG. 1. In principle, for all of the figures, the same reference signs are used for the same components or processes and it is only the differences that are mentioned in each case. Otherwise, in principle, the statements made with regard to the other embodiments apply accordingly.

FIG. 1b shows the bore shapes which are also relevant in terms of function and advantageous, but which can be produced using the proposed method, according to corresponding parametrization, such that they are different from the conical bore.

FIG. 2 schematically shows the preparation of the bore for the conical honing according to the invention. So that this processing process can be carried out quickly, cost-effectively and such that it can be reproduced, the bore to be processed has to be prepared. In a processing step 3 that is upstream of the actual process chain, a bore is made in the workpiece. This can be achieved by precision boring, rough honing or pre-honing, for example. This process step is provided with reference sign 3 in FIG. 2. The desired cylindrical bore is indicated by the lines 4 in block 3. The blank in which the bore is made is indicated by broken lines 6.

Block 5 schematically shows the first process step ("cylindrical honing") of the process chain according to the invention. This is a conventional honing process by means of which the cylindrical bore previously produced by precision boring for example is improved further in terms of geometry, diameter and surface thereof. Pre-honing can be carried out using a conventional honing tool, the honing stones of which are, for example, provided with diamond as the abrasive material. The stroke is constant in "cylindrical honing". This is shown in the central part of block 5 by means of a graph in which the stroke length H is plotted against the honing duration $t_{hon}$. The cylindrical honing is brought to an end as soon as an in-process measurement detects that the set value has been reached.

Once the first process step has come to an end, a bore is thus provided of which the geometry corresponds very closely to a cylinder. Furthermore, all cylindrical bores in series production have a very similar surface structure. These two phenomena together make it possible for the downstream process step of "conical honing" to also be carried out efficiently and reliably with low production variance and with reproducible results. An alternative to this is the process step of "cylindrical precision boring".

In principle, it is possible for the bore to be made into a conical bore in two different ways according to the invention. FIG. 3 shows a first alternative of the second process step of "conical honing" in block 7. The left-hand part of block 7 shows, schematically and in a highly exaggerated manner, the transition from the cylindrical bore 9, indicated by dashed lines, into the desired conical bore 11. The center of block 7 schematically shows the temporal sequence of the second process step of "conical honing".

Here, the stroke length H of the honing tool is plotted against time t. In this case, each stroke of the honing tool has two reversal points, specifically a lower reversal point UP and an upper reversal point OP. In block 7, the maximum stroke length $H_{max}$ travelled in the second process step is determined by the upper reversal point OP1 and the lower reversal point UP. At the beginning of the second process step, there is one stroke or only a small number of strokes having a constant stroke length, the stroke length being OP1–UP. At time $t_1$, specifically when the honing stones have been applied to the bore to be processed, which bore is still cylindrical at this point in time, the stroke length H should be reduced. In this case, one characteristic feature of the method according to the invention is that a reversal point, preferably the lower reversal point UP, remains unchanged, and the upper reversal point OP is reduced in a stepwise manner until a predefined limit value OP2 is reached. This brings process step 2 to an end.

Controlling the stroke H of the honing tool by incrementally reducing the stroke length K, while the lower reversal point UP remains the same, results in the bore being given the desired frustoconical lateral surface. The method according to the invention is very precise and only requires a small amount of time since the honing operation is brought to an end when the predefined limit value OP2 is reached.

This constitutes a significant advantage over the method known from DE 10 2013 204 714 A1. In this document, the above is still followed by a conventional processing phase characterized by a stroke that remains the same at a reduced stroke length. It was surprisingly found that the method according to the invention, which ultimately comprises just two parts, made it possible to produce, in an effective manner, bores which have been made into conical bores or are conical in a short space of time and such that they are of a very high quality.

It is also possible to widen a bore only in regions by the lower reversal point and the upper reversal point OP1 and OP2, respectively, being suitably positioned, and it is thus also possible to produce a bottle shape for the bore.

The second process step according to FIG. 3 is carried out either in a time-controlled manner or according to the number of strokes performed by the honing tool, or by the stroke position end value OP2 being reached. FIG. 4 shows a second alternative of the second process step of "conical honing".

In this alternative of the second process step, the honing stones 13 are fed according to the position of the honing tool in the bore to be processed. This means that the honing stones are fed in to a lesser extent at the upper end of the bore, i.e. close to the upper reversal point OP1, than at the lower reversal point UP. This relationship is shown in a graph in which the feeding Z is shown, in the form of line 15, against the position of the honing tool. This linear relationship is obviously only given by way of example. It is also possible for there to be a progressive or degressive relationship between the feeding Z and the position of the honing tool between the upper reversal point and the lower reversal point, and for the feeding of the honing tool to be controlled accordingly.

It is also possible for the characteristic of the feeding to change during processing. As a result, it is possible to even out the stress on the honing stones 13 and prevent overloading.

The second process step is executed in either a time-controlled manner or a stroke-controlled manner.

In this method, not only is it possible to produce conical bores, but it is also possible to produce a bottle shape for the bores and to widen the cylindrical bore at the upper end of the bore and/or at the lower end of the bore where necessary.

This alternative requires a honing tool that is suitable for form honing and allows the honing stones to be fed in a position-dependent manner. A honing tool of this kind is disclosed for example in DE 10 2007 038 123 from the applicant. However, equidistantly changing the feeding Z according to the stroke position of the honing tool so as to conform with the bottle-neck-shaped target surface line also makes it possible to produce the bottle-neck-shaped bore.

It is however also possible to carry out the process steps of "conical honing with decreasing stroke" and "conical honing with dynamic feeding" one after the other. As a result, the reverse curves in the region of the changing upper reversal point OP which are generated by the decreasing stroke are removed by the subsequent honing with dynamic feeding. This produces a honing pattern having a uniform structure in terms of the honing angle and roughness. The bore surface that has been topographically homogenized and improved in terms of shape in this manner makes the downstream process step of "smoothing by spring force" simpler and quicker.

Therefore, the two variants of the second process step are combined in the described order. The combination can be achieved in various processing stations. It is also possible to carry out the two operations one after the other on a spindle having a double-feed tool that is provided with various honing stones or also on a spindle having a single-feed tool that has a honing stone specification.

In any case, however, it has to be ensured that processing is first carried out with a changing stroke and processing is then carried out with changing feeding. Therefore, there is a maximum of four steps for processing non-cylindrical, rotationally symmetrical bores by form honing:

honing a cylindrical bore,
conical honing with changing stroke length,
conical honing with changing feeding,
smoothing honing by spring-mounted honing stones.

FIG. 5 shows, also schematically, in block 15 the third process step of "finish honing" optionally in combination with the fourth process step of "smoothing honing". The bore that was conically honed in the previous process step is provided with reference sign 17. The aim of the third process step of "finish honing" is to perform further processing while maintaining the conical bore or the geometry of the bore 17, the surface of which corresponds to the requirements of the particular use. As shown in FIG. 5, this can be achieved by honing with dynamic feeding in a manner similar to that of the second variant of the second process step (see FIG. 4). In this case, other cutting materials can be used in the honing stones 19. For example, silicon carbide can be used as an alternative cutting material. In other respects, the finish honing according to the first alternative shown in FIG. 5 is also carried out by means of a honing tool which makes it possible for the honing stones 19 to be fed according to the position of the honing tool in the bore. This third step is also carried out in a time-controlled manner or in a stroke-controlled manner, or by a pneumatic in-process measurement which can be used in all operations of the conical shaping and surface smoothing.

It is also possible for the fourth process step of "smoothing honing" to immediately follow this third process step.

In this case, the honing stones 19 which have been used for finish honing are brought out of engagement with the bore and a further set of honing stones (not shown in FIG. 5) are brought into engagement with the conically honed bore 17, which honing stones smooth the surface of the conical bore. This fourth processing step/process step is likewise carried out in a time-controlled manner or in a stroke-controlled manner.

FIG. 6 shows an alternative embodiment of the fourth process step of "smoothing honing". In this case, honing stones 23 are pressed in a spring-mounted manner against the bore 18 that is to be processed and has undergone finish honing. This is shown in the central part of block 21 by a graph in which the contact force F is plotted against the stroke H. The geometry of the bore 18 that has undergone finish honing is no longer changed by the smoothing honing. This fourth process step can likewise be carried out in a time-controlled manner or in a stroke-controlled manner.

FIG. 7 again demonstrates and illustrates the first alternative of the second process step that has already been briefly mentioned in connection with FIG. 3. FIG. 7 is a graph in which either the honing time in seconds or the number of double strokes of the honing tool is plotted on the x axis. In other words, FIG. 7 illustrates an alternative of the process step of "conical honing" according to the invention, which alternative step can be conducted in both a time-controlled manner and a stroke-controlled manner.

As is generally known, the honing tool performs a stroke movement, said tool oscillating between a lower reversal point UP and an upper reversal point OP.

In the second process step, some strokes of the honing tool are firstly performed at a maximum hub length OP1-UP until the honing stones have been applied to the bore which is still cylindrical. These strokes are not shown in FIG. 7. At t=t1, the bore is still cylindrical.

The desired conical shape of the bore is achieved according to the invention by the hub length H being reduced between strokes, from a maximum stroke Hmax=OP1-UP to a minimum stroke Hmin OP2-UP. In this case, the position of the lower reversal point UP remains unchanged. In other words, the lower part of the bore is processed by the honing stones of the honing tool (not shown) more often than the upper part of the bore. This results in the desired conical shape of the bore.

As soon as the hub length reaches the limit value OP2 or falls below said value, the second process step according to the invention comes to an end and the conical bore is produced.

If a bore having what is referred to as a "bottle shape" is intended to be honed instead of a conical bore, i.e. if the bore has a narrower upper cylindrical portion, an adjoining conical part, and then a further adjoining additional cylindrical portion, then this can also be achieved in a very cost-effective and reliable manner using the method according to the invention by appropriately selecting the lower reversal point UP. In this case, the lower reversal point UP would be shifted slightly further towards the upper reversal point OP.

In a particularly advantageous embodiment of the second process step according to the invention, the honing stones are fed always and exclusively during the time in which the honing tool is between the limit value OP2 and the lower reversal point UP or UP2. This is shown by a further graph in FIG. 7. This means that whenever the honing tool is between OP1 and OP2, there is no feeding. Only when the tool is in the region between OP2 and UP does feeding take place.

This has several positive effects: firstly, the contact force is always temporarily increased at the lower end of the bore to be widened, as a result of which the amount of material removed at said end is increased, and therefore the desired conical shape of the bore is achieved with a very high degree of accuracy. Furthermore, this procedure can be managed in terms of control in a particularly simple manner because a constant stroke speed is required which can begin feeding as soon as the honing tool heading towards the lower reversal point has reached the target value OP2. On the return path from the lower reversal point towards the upper reversal point, the feed movement is interrupted at the same location.

FIG. 8 illustrates the second embodiment of the second process step in more detail. In this case, it can be seen that a support strip 33, which supports the honing stone 13 shown in FIG. 4, is fed according to the stroke by an electromechanical feeding means 27 by means of a feeding rod 29 and feeding cone 31. In this case, the graph shows the pressing of the honing stone in the form of blocks 34. The feeding is plotted in this graph as straight line 35.

The electromechanical feeding means 27 and the implementation thereof in a feed movement of the honing stone 13 is described in DE 103 58 150 A1 for example.

FIG. 9 shows the third and fourth process steps (finish honing and smoothing honing) and the implementation thereof.

The left-hand part of FIG. 9 depicts the aim specifically of applying the honing stones 19 or 23 to the conical bore 11 for the finish honing or smoothing honing. This is achieved by a resilient element, which can be in the form of a spring (spiral spring, leaf spring or the like). The honing tool is shown in the left-hand part of FIG. 9 in two different positions, namely in a position in which it is close to the lower reversal point UP and in a position in which it is close to the upper reversal point OP.

The center of FIG. 9 shows a first implementation option for a tool for finish honing and/or smoothing honing. In this case, a feed movement is implemented in the same manner as shown in FIG. 8. The only difference is that a honing stone 23 is supported on the support strips 33, which honing stone is mounted in the manner of a pendulum and is pressed against the wall of the bore 11 by means of springs 25. The center of rotation of this honing stone 23 is provided with reference sign 35 in FIG. 9. It should be noted in this case that the pin which forms the center of rotation extends through a slot 37, and therefore the honing stone 23 can be applied to the contour of the wall 11 of the bore in an optimum manner.

The right-hand part of FIG. 9 shows a further embodiment of a suitable tool for finish honing and smoothing. This tool is known from DE 10 2014 000 476 A1 to which reference is hereby made.

FIG. 10 once again shows the implementation of the dynamic feeding according to FIG. 2 (second alternative of the second process step) and the implementation thereof in a honing tool. The blocks 39 indicated by dashed lines represent the honing stone 13 in different positions according to the stroke position of the honing tool 41. The stroke of the honing tool is indicated by a double arrow in FIG. 10.

FIG. 11 schematically shows a honing tool which has two groups of honing stones. The first process step (cylindrical pre-honing) and the second process step (conical honing) can be carried out using this honing tool. In order to carry out the first process step, the long honing stones 43 are brought into engagement with the bore to be processed (not shown). Feeding is achieved by means of two feeding cones (not shown) which interact with corresponding inclined surfaces of the support strips 45 in a manner which is known per se.

The honing stones 13 are used to hone the pre-honed bore such that it is conical. These honing stones 13 are relatively short by comparison with the honing stones 43 for the pre-honing. These honing stones 13 are also fed by means of support strips 47 and a second feeding device (not shown) of the honing tool.

FIG. 12 shows an embodiment of a honing tool that can have double feeding. Process steps 3 (finish honing) and 4 (smoothing honing) can be carried out using this tool. The honing tool is known per se from the prior art.

This tool has various honing stones. The relatively short honing stones 45 are used for finish honing, whereas the relatively long honing stones 47 are used for smoothing honing.

What is claimed is:

1. Method for making a cylindrical bore into a conical bore using a honing tool, wherein the honing tool comprises honing stones, the length of each of which is less than one third the length of the bore to be processed, comprising the steps of:

applying the honing stones of the honing tool to the bore, honing the bore over its entire length with a maximum stroke ($H_{Max}$=OP1−UP), wherein OP1 is an upper reversal point and UP is a lower reversal point, honing the bore with decreasing stroke, wherein a lower reversal point of the honing tool remains substantially unchanged, until a predefined end value for an upper reversal point is reached or a number of desired strokes with decreasing stroke is reached, wherein the maximum stroke is more than thrice the length of the minimum stroke.

2. Method according to claim 1, characterized in that the honing tool is only fed when the honing tool is close to the lower reversal point.

3. Method according to claim 2, characterized in that the honing tool is only fed when the honing tool is between the predefined end value and the lower reversal point.

4. Method according to claim 1, characterized in that a speed of a honing spindle is increased as the stroke is decreased.

5. Method according to claim 1, characterized in that a feed force by means of which the honing stones are pressed against the bore is controlled according to a position of the honing tool in the bore.

6. Method according to claim 1, characterized in that it comprises after honing the bore with decreasing stroke a step:

smoothing the bore by honing the bore with honing stones which are applied to the conical bore via a resilient element.

* * * * *